US011330617B2

(12) United States Patent
Park et al.

(10) Patent No.: US 11,330,617 B2
(45) Date of Patent: May 10, 2022

(54) SCHEDULING THRESHOLD REPORT FOR MULTI-TRANSMIT/RECEIVE POINTS

(71) Applicant: QUALCOMM Incorporated, San Diego, CA (US)

(72) Inventors: Sungwoo Park, San Diego, CA (US); Xiaoxia Zhang, San Diego, CA (US); Mostafa Khoshnevisan, San Diego, CA (US); Tao Luo, San Diego, CA (US); Jing Sun, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/855,347

(22) Filed: Apr. 22, 2020

(65) Prior Publication Data

US 2020/0344791 A1     Oct. 29, 2020

Related U.S. Application Data

(60) Provisional application No. 62/840,266, filed on Apr. 29, 2019.

(51) Int. Cl.
*H04W 72/12* (2009.01)
*H04W 72/04* (2009.01)

(52) U.S. Cl.
CPC ..... *H04W 72/1289* (2013.01); *H04W 72/042* (2013.01)

(58) Field of Classification Search
CPC .................. H04W 72/042; H04W 72/1289

USPC ....................................................... 370/329
See application file for complete search history.

(56) References Cited

U.S. PATENT DOCUMENTS

| 2021/0212098 | A1* | 7/2021 | Yoon ..................... H04L 5/0023 |
| 2021/0273699 | A1* | 9/2021 | Cao ...................... H04B 7/0617 |
| 2021/0298079 | A1* | 9/2021 | Tomeba ............ H04W 72/1289 |

(Continued)

FOREIGN PATENT DOCUMENTS

WO         2019099659 A1     5/2019

OTHER PUBLICATIONS

International Search Report and Written Opinion—PCT/US2020/029608—ISA/EPO—dated Jul. 3, 2020.

(Continued)

*Primary Examiner* — Peter G Solinsky
(74) *Attorney, Agent, or Firm* — Arent Fox, LLP

(57) ABSTRACT

A configuration is disclosed to enable a UE to determine and/or prepare Rx beams prior to downlink reception in multi-TRP operation. The apparatus sends, to a first TRP, a report indicating a plurality of threshold scheduled offsets. Each threshold scheduled offset associated with a different number of TCI states. The apparatus receives, from the first TRP, DCI including a TCI and a time-offset. The TCI comprising at least one TCI state. Each TCI state indicating a Tx beam for a TRP of a set of TRPs. The set of TRPs including the first TRP. The apparatus determines at least one Rx beam based on at least one of the received TCI, the time-offset, or one or more of the plurality of threshold scheduled offsets. The apparatus receives, based on the received time-offset, a PDSCH from each TRP of the set of TRPs through the determined at least one Rx beam.

22 Claims, 16 Drawing Sheets

(56) References Cited

U.S. PATENT DOCUMENTS

2021/0307031 A1* 9/2021 Chen ................... H04L 5/001

OTHER PUBLICATIONS

Samsung: "Remaining Details on PDSCH Beam Indication", 3GPP TSG RAN WG1 Meeting #91, 3GPP Draft; R1-1720302, 3rd Generation Partnership Project (3GPP), Mobile Competence Centre; 650, Route Des Lucioles; F-06921 Sophia-Antipolis Cedex; France, vol. RAN WG1, No. Reno, USA Nov. 27, 2017-Dec. 1, 2017, Nov. 17, 2017, XP051368951, 4 pages, Retrieved from the Internet: URL: http://www.3gpp.org/ftp/tsg%5Fran/WG1%5FRL1/TSGR1%5F91/Docs/ [retrieved on Nov. 17, 2017] Section 3, p. 1-p. 4.

Samsung: "On Beam Management, Measurement and Reporting", 3GPP TSG RAN WG1 Meeting #91, 3GPP Draft R1-1720290_V1, 3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Nov. 17, 2017 (Nov. 17, 2017), XP051368939,15 Pages, Retrieved from the Internet: URL: http://www.3gpp.org/ftp/tsg_ran/WG1_RL1/TSGR1_91/Docs/ [retrieved on Nov. 17, 2017], Sections 2.1, 2.4, Proposal 7.

ZTE: Enhancements on Multi-TRP Transmission and Reception , 3GPP TSG RAN WG1 Meeting #94, 3GPP Draft; R1-1808202 Enhancements On Multi-TRP Transmission and Reception, 3rd Generation Partnership Project (3GPP), Mobile Competence Centre; 650, Route Des Lucioles; F-06921 Sophia-Antipolis CE, vol. RAN WG1, No. Gothenburg, Sweden; Aug. 20, 2018-Aug. 24, 2018, Aug. 11, 2018 (Aug. 11, 2018), 5 Pages, XP051515587, Retrieved from the Internet: URL: http://www.3gpp.org/ftp/tsg%5Fran/WG1%5FRL1/TSGR1%5F94/Docs/R1%2D1808202%2Ezip [retrieved on Aug. 11, 2018], Sections 1, 2.2.

* cited by examiner

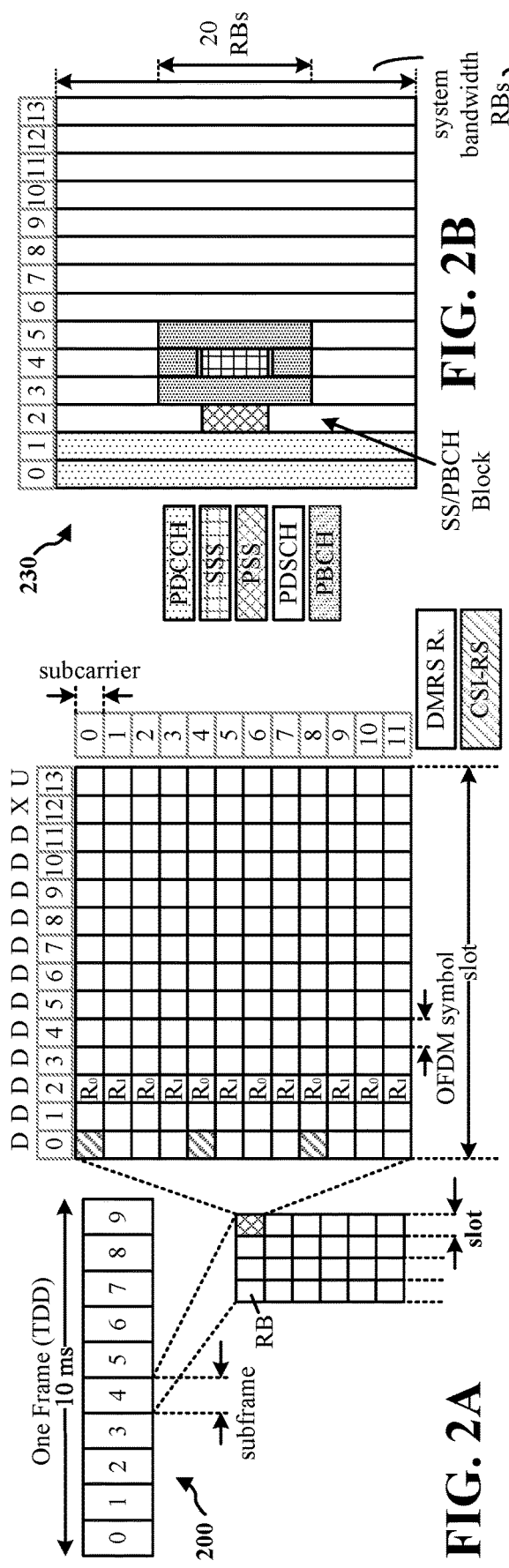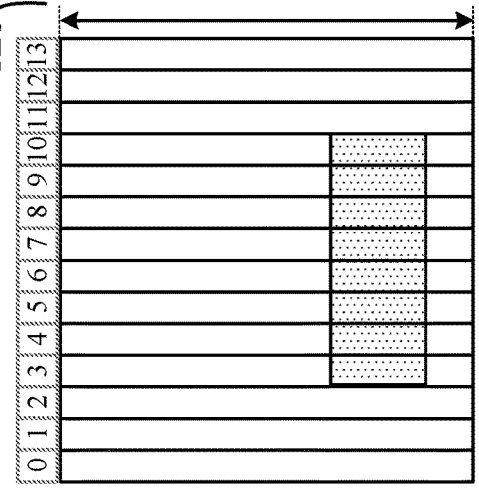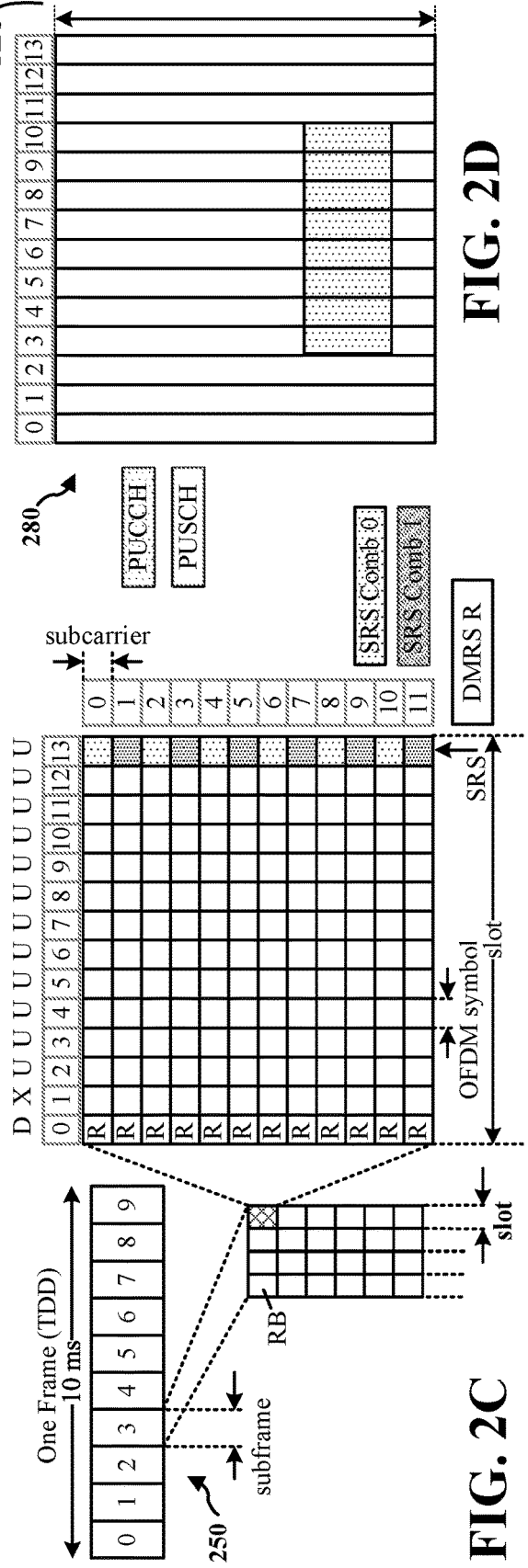

SCHEDULING THRESHOLD REPORT FOR MULTI-TRANSMIT/RECEIVE POINTS

CROSS REFERENCE TO RELATED APPLICATION(S)

This application claims the benefit of U.S. Provisional Application Ser. No. 62/840,266, entitled "Scheduling Threshold Report for Multi-Transmit/Receive Points" and filed on Apr. 29, 2019, which is expressly incorporated by reference herein in its entirety.

BACKGROUND

Technical Field

The present disclosure relates generally to communication systems, and more particularly, to beam scheduling procedures for multi-transmit/receive points (TRPs) in wireless communications networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

To provide for more efficient and enhanced communications, the present disclosure allows a User Equipment (UE) to provide a report, to a base station, including multiple thresholds related to the minimum time required by the UE to determine and prepare reception (Rx) beams prior to downlink data reception in a wireless communications network having multi-TRPs. In a multi-TRP environment, the UE may need more time to prepare multiple Rx beams in comparison to preparing a single Rx beam for a single TRP. Thus, the UE may provide the report to a base station, associated with one or a plurality of TRPs, including various thresholds, with each threshold associated with different transmission configuration indication (TCI) states. The TCI states may be related to the number of Rx beams the UE would need to prepare. The base station takes into account the information in the report from the UE in preparing the transmission scheduling between the TRPs and the UE, and transmits the TCI to the UE. The UE may determine the number of Rx beams it needs to prepare based on the received TCI.

In an aspect of the disclosure, a method, a computer-readable medium, and an apparatus are provided for generating a report for beam scheduling procedures for multi-TRPs. The apparatus sends, to a first TRP, a report indicating a plurality of threshold scheduled offsets. In some aspects, each threshold scheduled offset may be associated with a different number of transmission configuration indication (TCI) states. The apparatus receives, from the first TRP, downlink control information (DCI) including a TCI and a time-offset. In some aspects, the TCI may comprise at least one TCI state. In some aspects, each TCI state may indicate a Tx beam for a TRP of a set of TRPs. The set of TRPs may include the first TRP. The apparatus determines at least one Rx beam based on at least one of the received TCI, the time-offset, or one or more of the plurality of threshold scheduled offsets. The apparatus receives, based on the received time-offset, a physical downlink shared channel (PDSCH) from each TRP of the set of TRPs through the determined at least one Rx beam.

In another aspect of the disclosure, a method, a computer-readable medium, and an apparatus are provided for generating DCI for beam scheduling procedures for multi-TRPs. The apparatus receives, from a user equipment (UE), a report indicating a plurality of threshold scheduled offsets. In some aspects, each threshold scheduled offset may be associated with a different number of TCI states. The apparatus sends, to the UE, DCI including a TCI and a time-offset. In some aspects, the TCI may comprise at least one TCI state. In some aspects, each TCI state may indicate a Tx beam for a TRP of a set of TRPs. The set of TRPs may include the first TRP. The apparatus sends, based on the time-offset, a PDSCH through the Tx beam indicated for the first TRP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
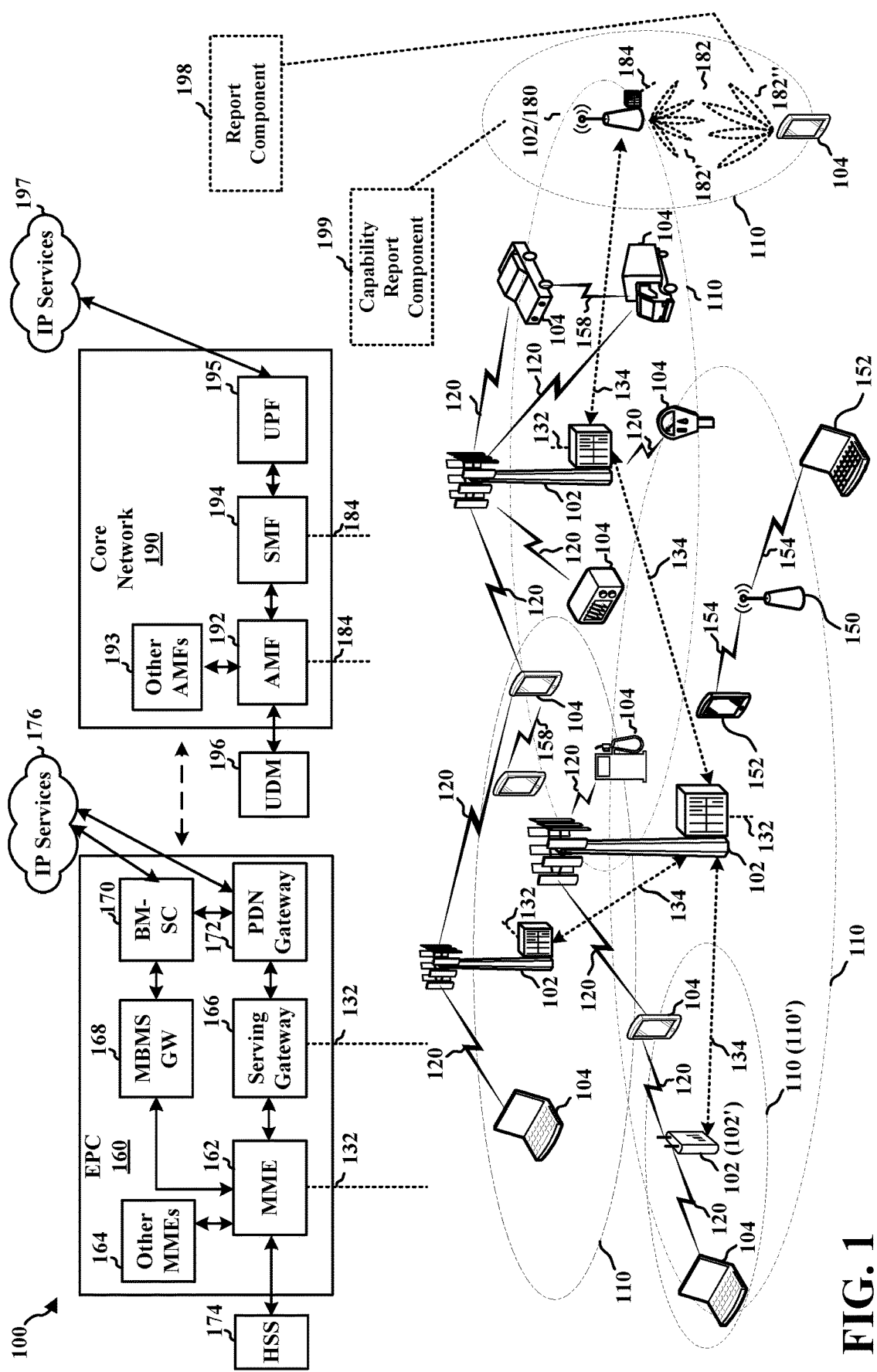
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to assist the network in scheduling transmission (Tx) and reception (Rx) beam pairings by improving the manner in which UEs report their capabilities, such that UEs have sufficient time to prepare one or more Rx beams for multi-TRP operation. For example, the UE 104 of FIG. 1 includes a report component 198 configured to send a report to at least one TRP indicating a plurality of threshold scheduled offsets, where each threshold scheduled offset is associated with a different number of TCI states. The report sent by the UE 104 may have a threshold scheduled offset for any number and/or configuration of TRPs transmitting to the UE.

Referring again to FIG. 1, in certain aspects, the base station 102/180 may be configured to process a report from the UE 104 to assist the base station in scheduling Tx beams for multi-TRP operation. For example, the base station 102/180 of FIG. 1 includes a capability report component 199 configured to receive the report having the plurality of threshold scheduled offsets from the UE, such that the base station takes into consideration the plurality of threshold scheduled offsets from the UE for scheduling Tx beams for multi-TRP operation.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
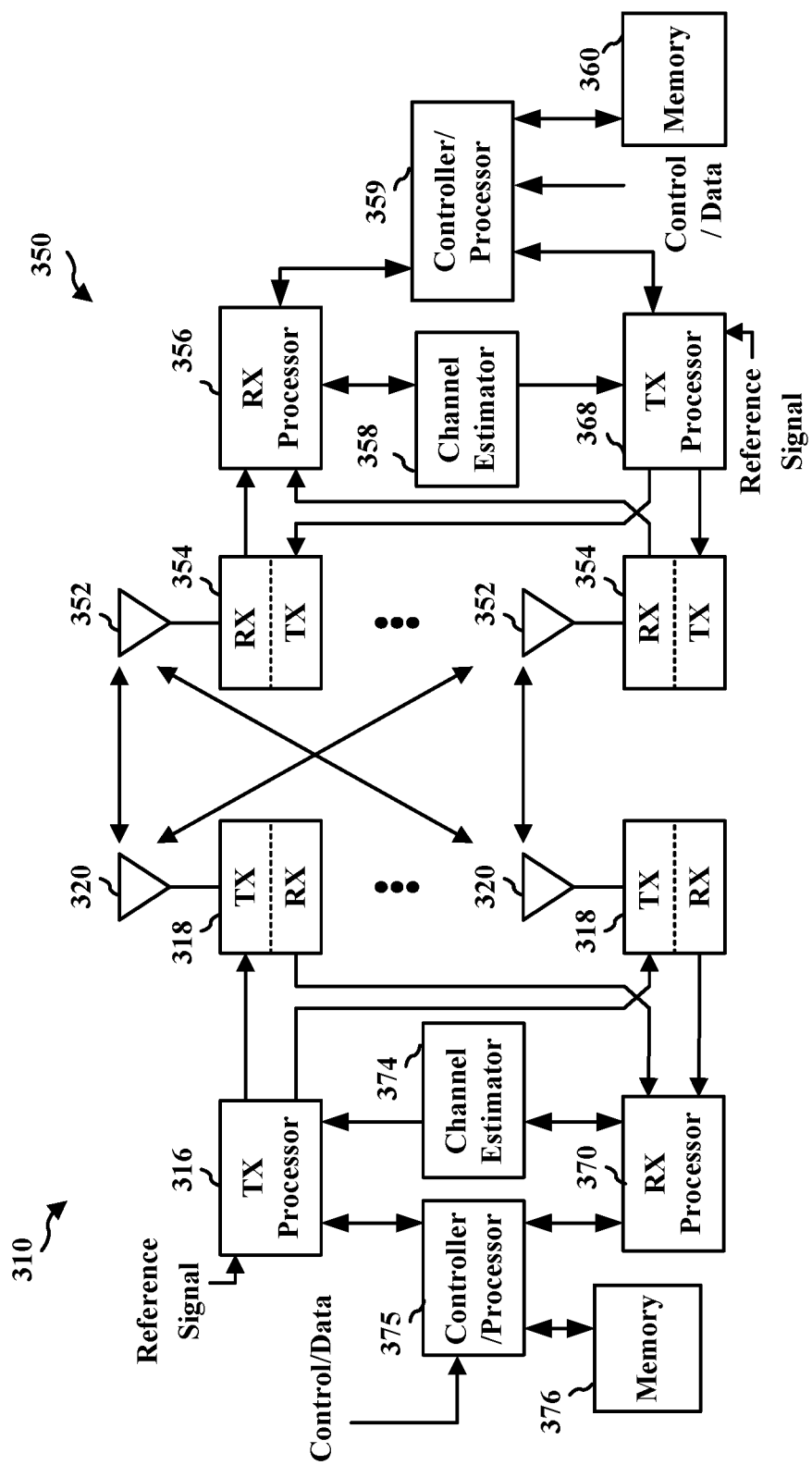
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

A TRP may be a transmission/reception node that is controlled by an entity (e.g., a base station), and configured to wirelessly communicate with another device (e.g., UE). In order for the UE to receive data from a TRP, the base station may inform the UE of the Transmission Configuration Indication (TCI) state. The TCI state may include transmission (Tx) beam information of the TRP. The UE, using the Tx beam information, may determine the corresponding Rx beam to use to receive data from the TRP. The UE may be configured to inform the base station of a minimum time required to prepare the Rx beam, which the base station may account for when providing the TCI state to the UE. In a multi-TRP environment, the UE may receive multiple transmissions from multiple TRPs. As such, the UE may prepare multiple Rx beams for each Tx beam of the multiple TRPs. The base station may prepare the Tx beam information, based on the various time-offset thresholds from the UE and the number of Tx beams, such that the UE may determine the Rx beams to prepare based, in part, on the time-offset provided by the base station.

Figure 4:
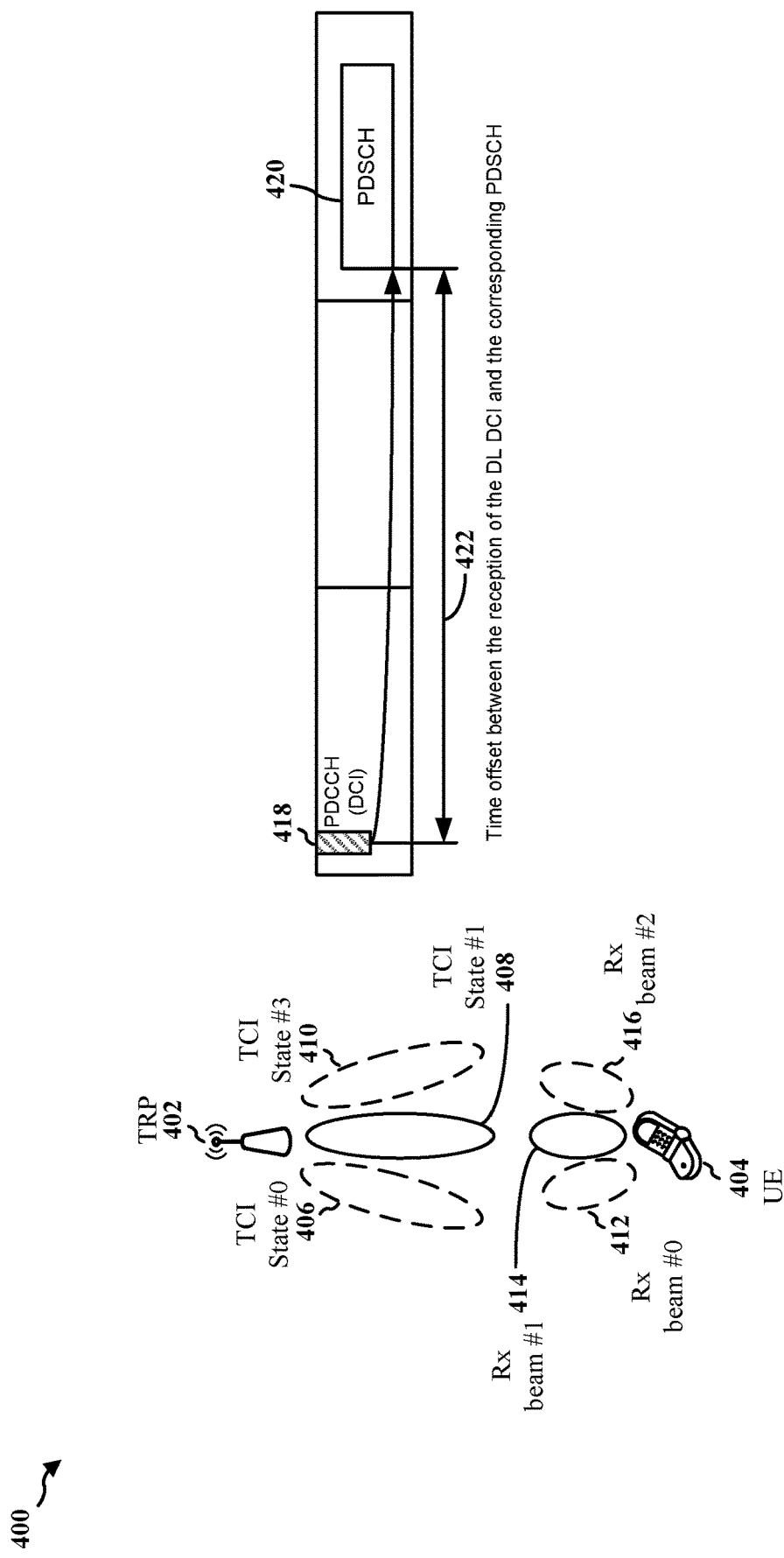
FIG. 4 is a diagram illustrating an example of wireless communication between a TRP and a UE.

FIG. 4 is a diagram illustrating an example of wireless communication between a TRP and a UE. The diagram 400 of FIG. 4 includes a TRP 402 and a UE 404. The TRP 402 and UE 404 may be configured to communicate with each other, and may operate in single-TRP operation. In order for the UE 404 to receive downlink transmissions from the TRP 402, the UE may determine and prepare a Rx beam prior to PDSCH reception. The base station (not shown) associated with the TRP 402 may transmit DCI to the UE 404, wherein the DCI includes TCI information. The TCI information may include Tx beam information, which may informs the UE 404 of the Tx beam information of the TRP 402. The UE 404 receives and processes the DCI to determine and prepare the appropriate Rx beam prior to a PDSCH reception. The Rx beam prepared by the UE 404 may be based in part on the TCI information.

Tx and Rx beam pairings may be conducted by the UE 404 and the TRP 402 prior to a PDSCH procedure. Tx and Rx beam pairing may be conducted in the UE by using Synchronization Signal Block (SSB) and/or CSI-RS before PDSCH reception. In the aspect of FIG. 4, the TRP 402 has three beams or TCI states (TCI state #0 406, TCI state #1 408, and TCI state #3 410) and the UE 404 may have three beams (e.g., Rx beam #0 412, Rx beam #1 414, and Rx beam #3 416), such that there are three beam pairs. In some aspects, the UE 404 may know the Tx beam of the TRP, and the UE may decide which Rx beam is to be paired with the Tx beam. In the aspect of FIG. 4, the Rx beam #1 414 is selected as being paired with the Tx beam of the TRP 402. Providing the Tx beam information of the TRP 402 to the UE 404 allows the UE to determine and prepare its Rx beam before reception of the PDSCH 420.

The UE 404 may determine the Rx beam based on the TCI which may be included in the DCI. The TCI may include the PDSCH Tx beam. The DCI may be provided to the UE 404 via PDCCH 418. The UE utilizes the TCI information to prepare the determined Rx beam for PDSCH reception. However, it may take a period of time for the UE 404 to determine and prepare the Rx beam. As such, the base station may schedule a time-offset between the DCI 418 and the PDSCH 420. This time-offset 422 may also be included in the DCI.

Figure 5:
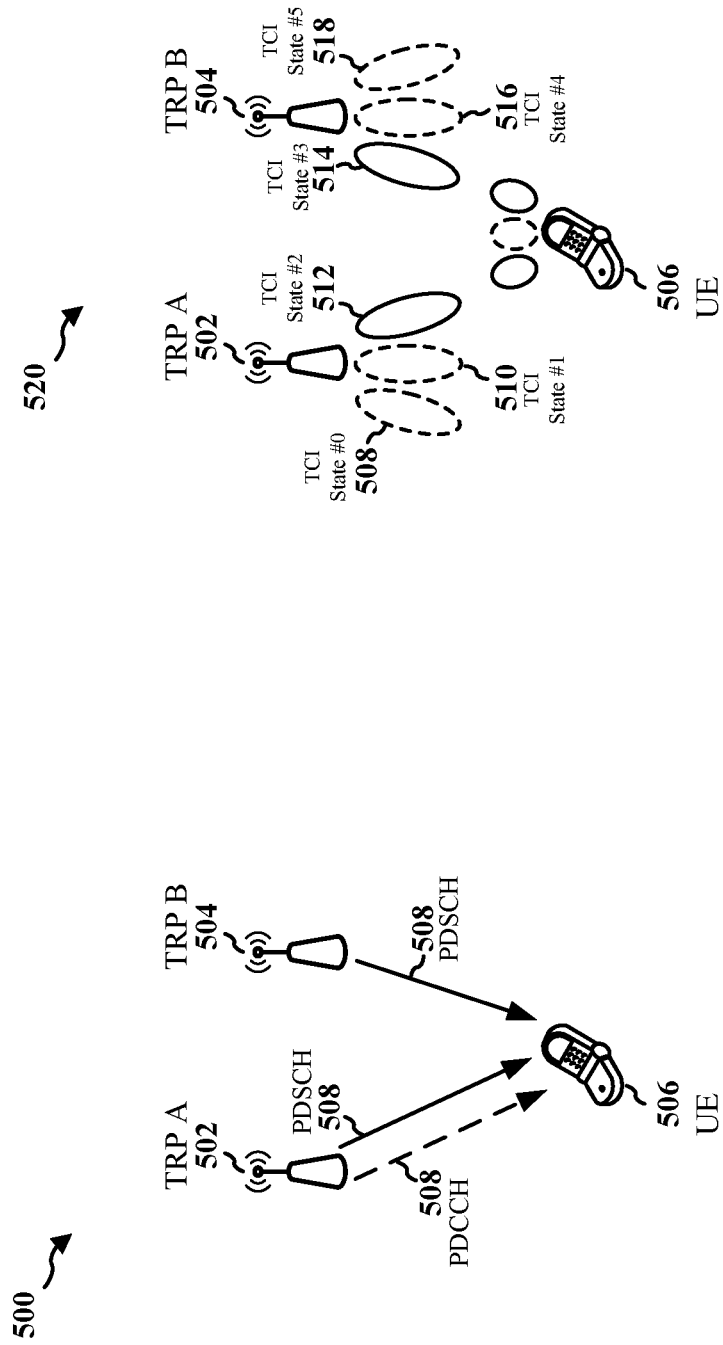
FIG. 5 is a diagram illustrating an example of a UE in multi-TRP operation in accordance with certain aspects of the disclosure.

FIG. 5 is a diagram illustrating an example of a UE in multi-TRP operation in accordance with certain aspects of the disclosure. The diagram 500 of FIG. 5 includes a TRP A 502, a TRP B 504, and a UE 506. The TRP A 502 and B 504 may be similar to the TRP 402. A UE in multi-TRP operation means that multiple TRPs are used for PDSCH transmission, or stated differently, one UE may receive the PDSCH transmission from one or more TRPs. However, in some aspects, a single PDCCH may be used to schedule the PDSCH. Various TRP transmission schemes have been discussed for multi-TRP, where a single PDCCH schedules a single PDSCH. For example, different TRPs may transmit in different spatial layers in overlapping RBs/symbols, which is known as Spatial Division Multiplex (SDM). In another example, different TRPs may transmit in different RBs, which is known as Frequency Division Multiplex (FDM). In yet another example, different TRPs may transmit in different OFDM symbols, which is known as Time Division Multiplex (TDM).

If a single DCI is used to schedule a multi-TCI transmission, in all of the above schemes, such as but not limited to, SDM, FDM, and TDM, the TCI field in the DCI may indicate multiple TCI states for the purpose of receiving the scheduled PDSCH. In some aspects, the TCI field in the DCI may indicate 2 TCI states, where each TCI in the DCI may correspond to 1 or 2 TCI states. The disclosure is not intended to be limited by the aspects disclosed herein. In some aspects, the TCI field in the DCI may indicate more than two TCI states, where each TCI may correspond to more than two TCI states.

The diagram 520 is similar to diagram 500, but instead displays the Tx beams of the TRPs A and B and the Rx beams of the UE 506. The UE utilizes the TCI information within the DCI, and the TCI may correspond to 2 TCI states (e.g., TCI state #2 512 and TCI state #3 514). In such aspect, the UE receives the DCI and then knows that TCI state #2 and #3 are going to be used by the TRPs, which means that TRP A 502 will use TCI state #2 512 and that TRP B 504 will use TCI state #3 514. As such, the UE 506 may prepare two Rx beams that may correspond to TCI state #2 and #3.

Figure 6:
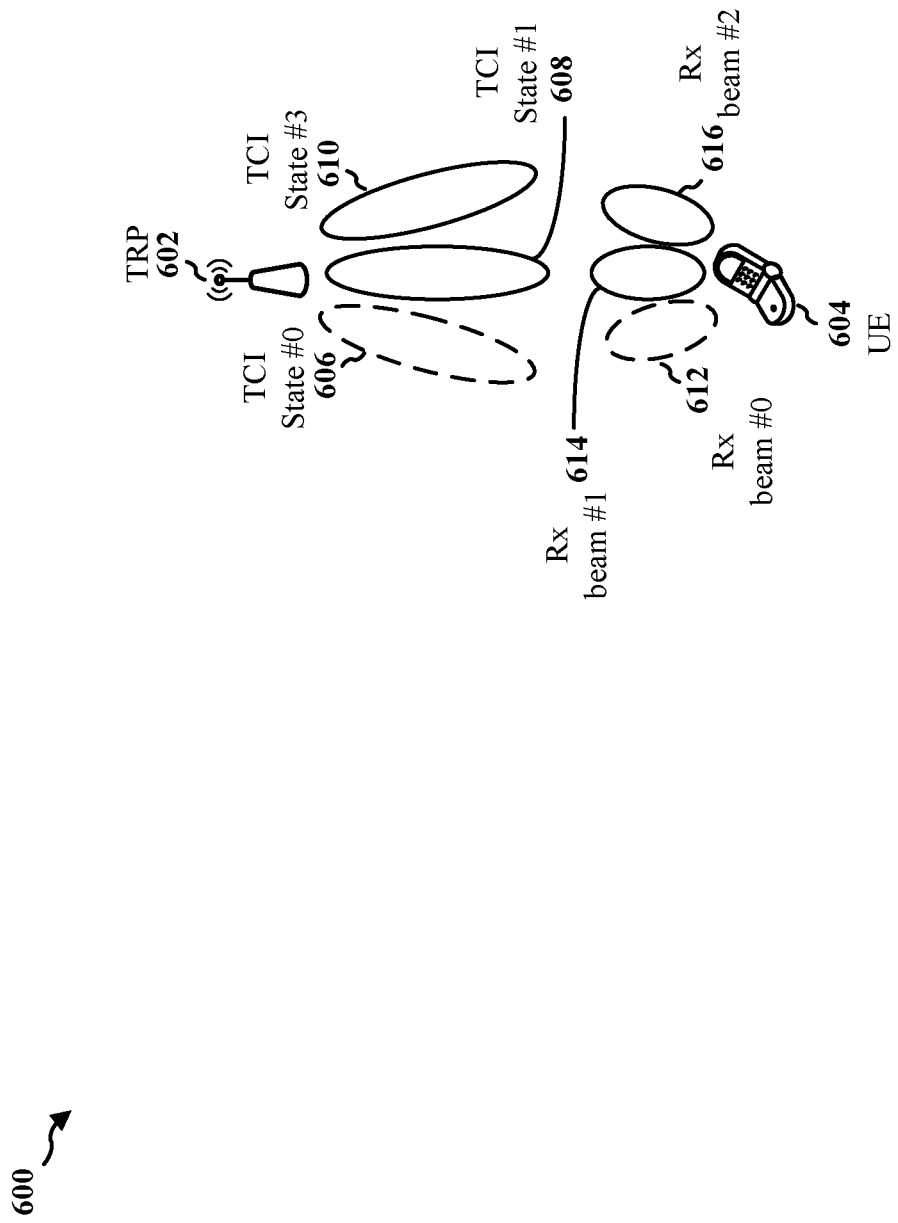
FIG. 6 is a diagram illustrating an example of a UE in multi-beam operation in accordance with certain aspects of the disclosure.

FIG. 6 is a diagram illustrating an example of a UE in multi-beam operation in accordance with certain aspects of the disclosure. In diagram 600 of FIG. 6 includes a TRP 602 and a UE 604, and may be similar to the TRPs and UEs of FIGS. 4 and 5. However, the UE and TRP of FIG. 6 are arranged in a multi-beam operation for a single-TRP operation. Multi-beam operation may be similar to the multi-TRP operation. In the aspect of FIG. 6, the single TRP 602 sends 2 beams (TCI state #1 608 and TCI state #610), such that the UE prepares 2 Rx beams. Thus, the present disclosure may also be applicable to multi-beam operation as well as multi-TRPs.

Figure 7:
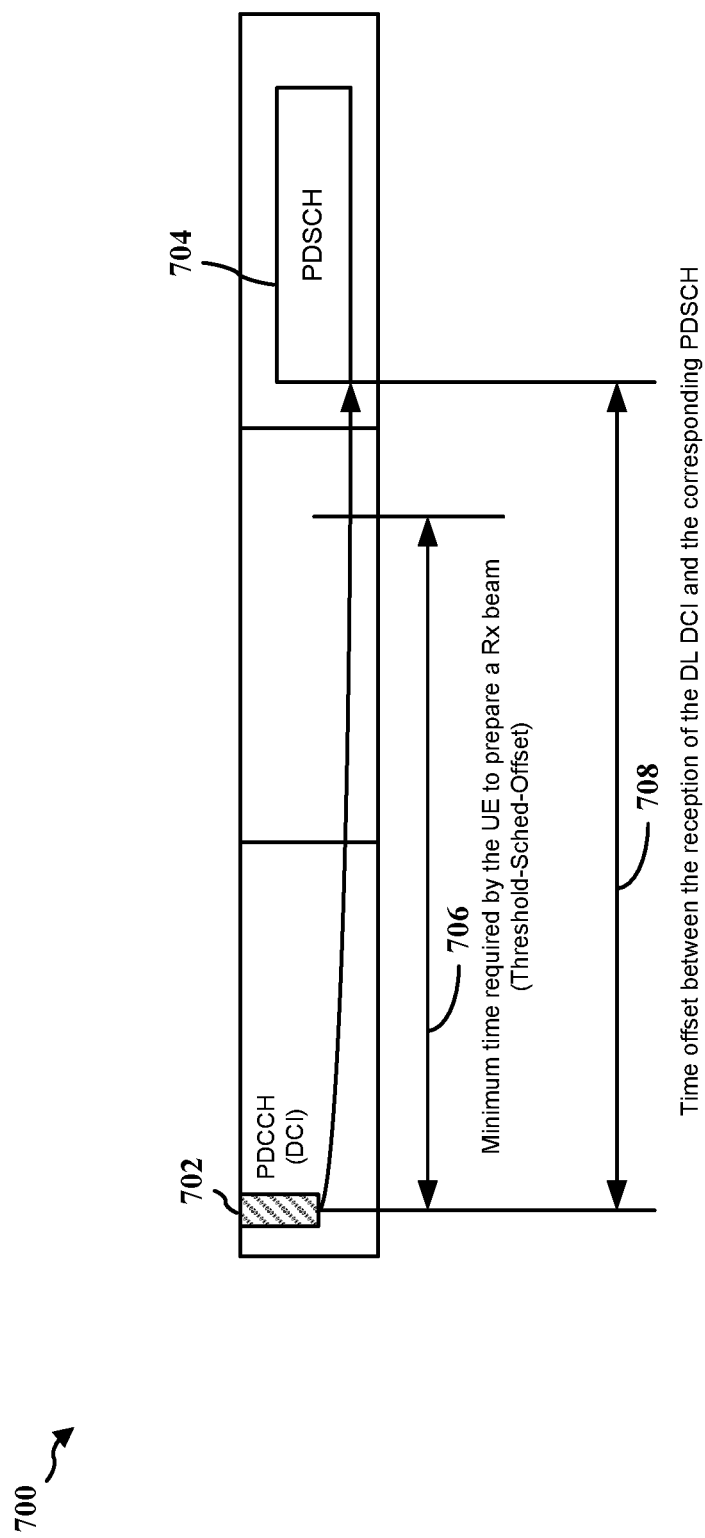
FIG. 7 is a diagram illustrating an example of PDSCH reception in view of a time offset in accordance with certain aspects of the disclosure.
Figure 8:
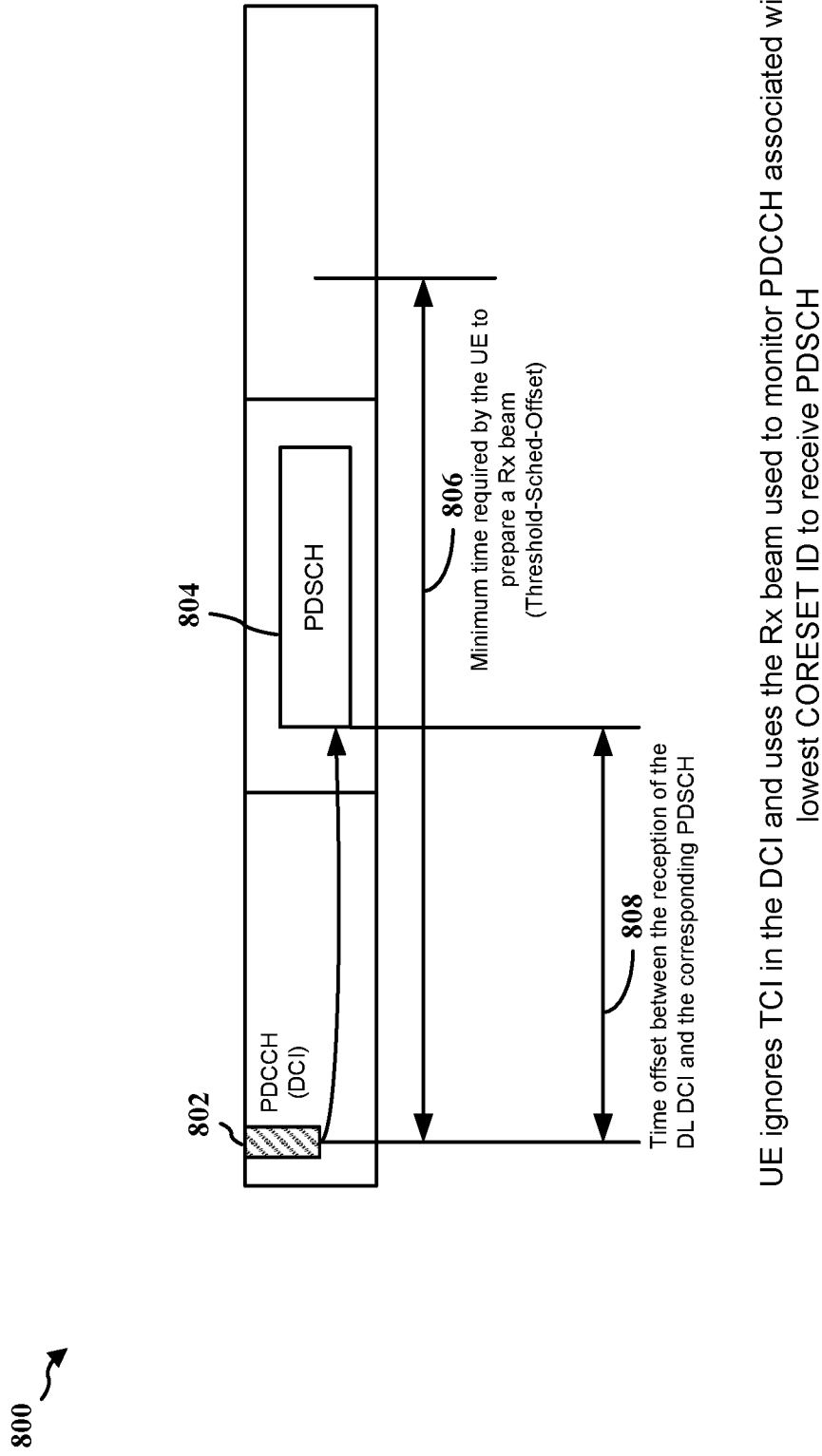
FIG. 8 is a diagram illustrating another example of PDSCH reception in view of a time offset in accordance with certain aspects of the disclosure.

FIGS. 7 and 8 are diagrams illustrating an example of PDSCH reception in view of a time offset in accordance with certain aspects of the disclosure. The diagram 700 of FIG. 7 includes a PDCCH 702, a PDSCH 704, a threshold 706, and a time-offset 708. The diagram 800 of FIG. 8 includes a PDCCH 802, a PDSCH 704, a threshold 806, and a time-offset 808. The threshold 706, 806 is a parameter Threshold-Sched-Offset which may define a minimum time required by a UE to prepare a Rx beam. The threshold 706, 806 may be reported by the UE as part of the UE capability report. The UE capability report may provide a list of the capabilities of the particular UE. Various UEs may or may not support some or all similar features. The base station, associated with the one or more TRPs, may be configured to decide the scheduling time-offset based at least in part on threshold 706 or Threshold-Sched-Offset. In some aspects, the UE may decide which Rx beam to use for the PDSCH reception based at least in part on Threshold-Sched-Offset.

With reference to FIG. 7, the time-offset 708 in the DCI may be indicated in the DCI message, and if the time-offset 708 is greater than or equal to the threshold 706 or Threshold-Sched-Offset, then the UE may use the Rx beam indicated by the TCI in the DCI to receive the corresponding PDSCH. The DCI may include the time-offset 708 and TCI. The threshold or Threshold-Sched-Offset 706 may define a minimum time required by the UE to prepare the Rx beam, and the time-offset 708 may be the time difference between the reception of the DCI and the correspond PDSCH. The value of the threshold 706 may be reported by the UE to the base station via RRC signaling. In view of the diagram of FIG. 7, if the time-offset 708 in the DCI is greater than or equal to the threshold or Threshold-Sched-Offset 706, then the UE may use the Rx beam indicated by TCI.

With reference to FIG. 8, in some aspects the time-offset 808 of the DCI may be less than the threshold 806 which defines the minimum required time for the UE to prepare the Rx beam. As such, the UE may ignore the TCI in the DCI and use the Rx beam used to monitor the PDCCH associated with the lowest CORESET ID to receive the PDSCH. In view of the diagram of FIG. 8, if the time off-set 808 in the DCI is less than the threshold 806, then the UE may ignore the TCI in the DCI and may use the Rx beam used to monitor the PDCCH to receive the PDSCH.

In some aspects, the base station, in scheduling Tx beams, may decide which option (e.g., FIG. 7 or FIG. 8) it will use and once the base station decides then, the DCI may inform the UE of the decision by using the time-offset and TCI in the DCI message. As such, the UE may decide which method to use to determine the Rx beam.

In single-TRP operation, use of the minimum time will be sufficient time to prepare the Rx beam. However, if multi-TRP operation is going to be used, then the minimum time required by the UE to prepare the Rx beam may not be sufficient and may have to be increased. In some aspects, the minimum time required by the UE to prepare the Rx beam may depend on how many TRPs transmit the PDSCH. Thus, in multi-TRP operation, the UE may take more time to prepare multiple Rx beams in comparison to single-TRP operation.

The present disclosure relates to improving the manner in which capabilities of a wireless device are provided to a base station. The present disclosure may allow a UE to provide a report, to a base station, including multiple thresholds related to the minimum time for the UE to determine and prepare Rx beams prior to PDSCH reception in a wireless communications network having multi-TRPs. In the multi-TRP environment, the UE may use more time to prepare the multiple Rx beams in comparison to a single TRP case. Thus, the UE may be configured to provide a report to the base station which includes various time-offset thresholds based on the number of Rx beams the UE may prepare. The report may be utilized by the base station to generate the schedule for Tx and Rx beam pairings, such that the base station may ensure that UEs have sufficient time to determine and prepare one or more Rx beams based on a schedule sent by the base station to the UE.

Figure 9A:
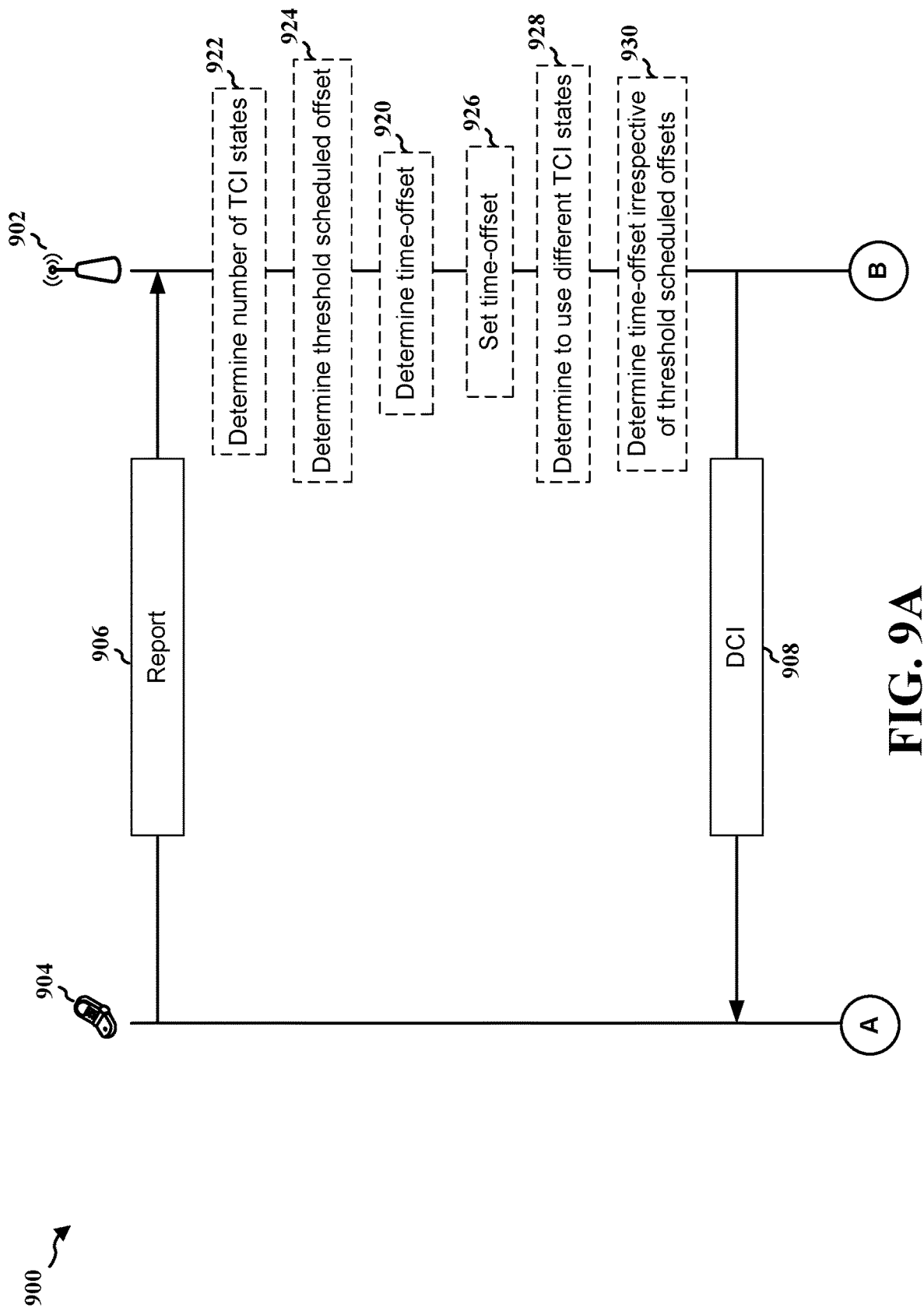
FIGS. 9A-9B are a call flow diagram of signaling between a UE and at least one TRP of a multi-TRP configuration in accordance with certain aspects of the disclosure.
Figure 9B:
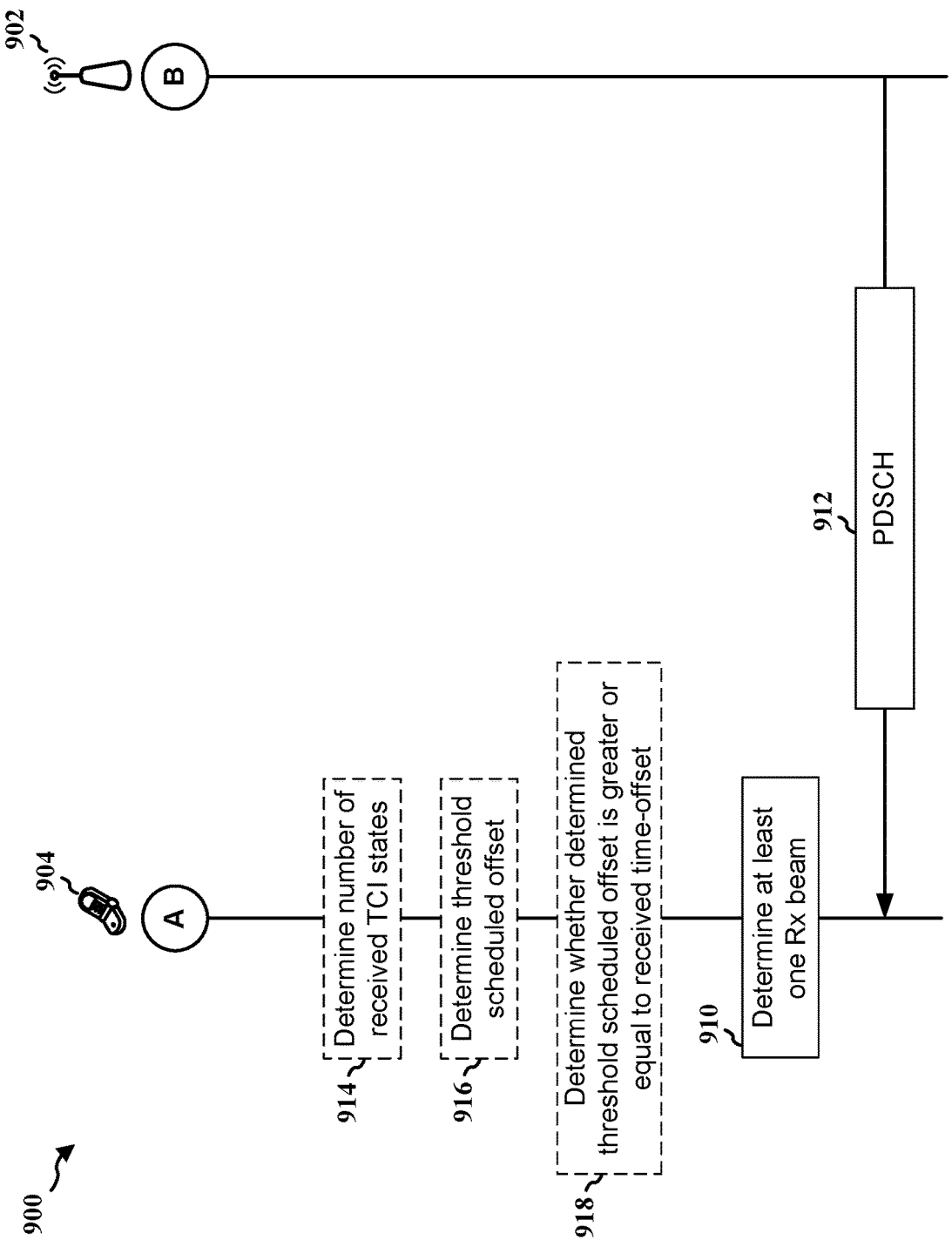

FIGS. 9A-9B are a call flow diagram of signaling between a UE and at least one TRP of a multi-TRP configuration in accordance with certain aspects of the disclosure. The diagram 900 of FIGS. 9A-9B includes a TRP 902 and a UE 904. The TRP 902 may be configured to provide a cell. For example, in the context of FIG. 1, the TRP 902 may correspond to base station 102/180 and, accordingly, the cell may include a geographic coverage area 110 in which communication coverage is provided and/or small cell 102' having a coverage area 110'. Further, a UE 904 may correspond to at least UE 104. In another example, in the context of FIG. 3, the TRP 902 may correspond to base station 310 and the UE 904 may correspond to UE 350. Optional aspects are illustrated with a dashed line.

The UE 904 may be configured to provide the base station (not shown) with a report directed to the minimum time for the UE to prepare Rx beams, wherein the report provides different threshold for various TCI states. In some aspects, the report (e.g., 906) may comprise a threshold for one TCI state, where the minimum time for the UE to prepare an Rx beam for one TCI state. In some aspects, the report may comprise a threshold for two TCI states (e.g., a TCI pair: TCI state 1 for TRP 1, TCI state 2 for TRP 2). In some aspects, the report may comprise a threshold for three TCI states. The minimum time for the UE to prepare Rx beams may increase as the number of TCI states increase. The UE 904 may send a report (e.g., 906) indicating a plurality of threshold scheduled offsets. In some aspects, each threshold scheduled offset may be associated with a different number of TCI states. In some aspects, each threshold scheduled offset may be a minimum UE time offset capability between receiving the DCI and receiving the PDSCH subsequent to the time-offset for configuring one or more Rx beams based on the corresponding number of TCI states. The UE 904 may send the report (e.g., 906) to the TRP 902.

The TRP 902 may receive the report (e.g., 906) from the UE 904 including the plurality of threshold scheduled offsets. The TRP 902 may take the reported thresholds into consideration for scheduling. In some aspects, each threshold scheduled offset may be associated with a different number of TCI states. In some aspects, each threshold scheduled offset may be a minimum UE time offset capability between the UE receiving the DCI and the UE receiving the PDSCH subsequent to the time-offset for the UE to configure one or more Rx beams based on the corresponding number of TCI states.

In some aspects, if the time offset is greater than the minimum time required by the UE to prepare Rx beams as shown in FIG. 7 to determine the time-offset, the base station, at 922, may determine a number of TCI states of the at least one TCI state sent within the TCI. In some aspects, if the time offset is greater than the minimum time for the UE to prepare Rx beams as shown in FIG. 7 to determine the time-offset, the base station, at 924, may determine the threshold scheduled offset associated with the determined number of TCI states.

In some aspects, for example at 920, the base station may determine the time-offset based on one or more of the plurality of threshold scheduled offsets by setting the time-offset to be greater than or equal to the one or more of the plurality of threshold scheduled offsets.

In some aspects, if the time offset is greater than the minimum time for the UE to prepare Rx beams as shown in FIG. 7 to determine the time-offset, the base station, at 926, may set the time-offset to a value greater than or equal to the determined threshold scheduled offset.

In some aspects, if the time offset is less than the minimum time for the UE to prepare Rx beams as shown in FIG. 8 the base station, at 928, may determine to use TCI states different from the at least one TCI state indicated in the TCI of the DCI. In some aspects, if the time offset is less than the minimum time for the UE to prepare Rx beams as shown in FIG. 8 the base station, at 930, may determine the time-offset irrespective of the plurality of threshold scheduled offsets, the time-offset may be less than the plurality of threshold scheduled offsets.

The TRP 902 may send, to the UE 904, DCI 908 including a TCI and a time-offset. In some aspects, the TCI may comprise at least one TCI state. In some aspects, each TCI state indicating a Tx beam for a TRP of a set of TRPs. In some aspects, the set of TRPs may include the first TRP.

The UE 904 may receive, from the first TRP 902, DCI including TCI and a time-offset. In some aspects the TCI may comprise at least one TCI state, each TCI state indicating a Tx beam for a TRP of a set of TRPs, the set of TRPs including the first TRP. At 910, the UE 904 may determine at least one Rx beam based on at least one of the received TCI, the time-offset, or one or more of the plurality of threshold scheduled offsets.

In some aspects, for example at 914, in order to determine the at least one Rx beam, the UE may determine a number of received TCI states of the at least one TCI state received within the TCI. In some aspects, for example at 916, to determine the at least one Rx beam, the UE may determine the threshold schedule offset associated with the determined number of TCI states. In some aspects, for example at 918, to determine the at least one Rx beam, the UE may determine whether the determined threshold offset scheduled offset is greater than or equal to the received time-offset, as shown in reference to FIGS. 7 and 8. In some aspects, the at least one Rx beam may be determined based on the received TCI if the received time-offset is greater than or equal to the determined threshold scheduled offset. In some aspects, the at least one Rx beam may be determined based on one or more Rx beams used to monitor a PDCCH if the received time-offset is less than the determined threshold scheduled offset. In some aspects, the PDCCH may be associated with a lowest CORESET identifier.

The TRP 902 may send a PDSCH 912 through the Tx beam indicated for the first TRP. In some aspects, the PDSCH may be sent based on a time-offset.

Figure 10:
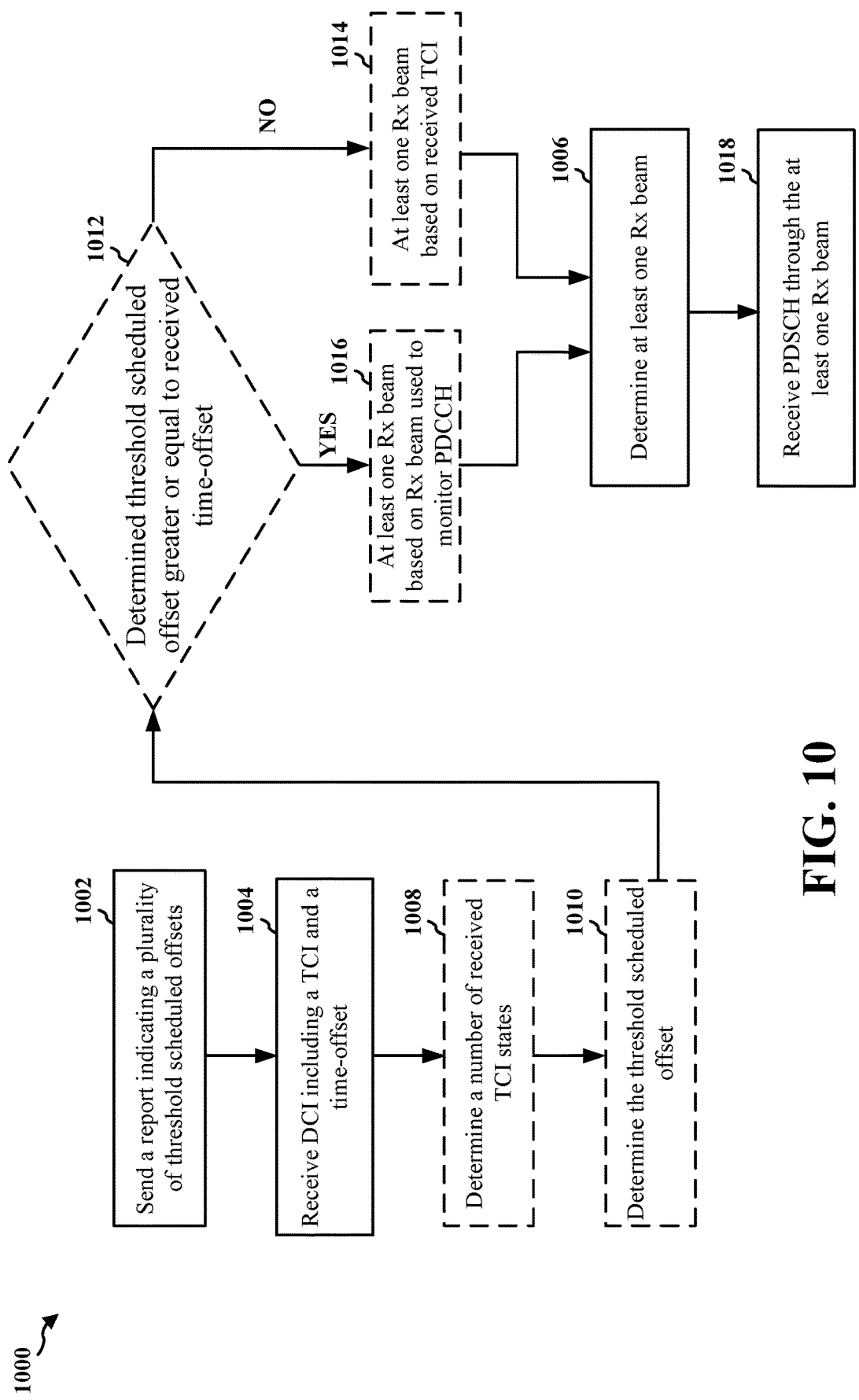
FIG. 10 is a flowchart of a method of wireless communication.

FIG. 10 is a flowchart 1000 of a method of wireless communication. The method may be performed by a UE or a component of a UE (e.g., the UE 104, 350, 404, 506, 604, 904, 1450; the apparatus 1102/1102; the processing system 1214, which may include the memory 360 and which may be the entire UE 350 or a component of the UE 350, such as the TX processor 368, the RX processor 356, and/or the controller/processor 359). According to various aspects, one or more of the illustrated operations of the method 1000 may be omitted, transposed, and/or contemporaneously performed. Optional aspects are illustrated with a dashed line. The method may enable a UE to determine and/or prepare Rx beams prior to downlink data reception (e.g., PDSCH) in multi-TRP operation.

At 1002, the UE (e.g., 904) may send, to a first TRP (e.g., 902), a report (e.g., 906) indicating a plurality of threshold scheduled offsets, as shown in connection with FIG. 9. For example, 1002 may be performed by report component 1106 of apparatus 1102. In some aspects, each threshold scheduled offset may be associated with a different number of TCI states. In some aspects, each threshold scheduled offset may be a minimum UE time offset (e.g., 708, 808) capability between receiving the DCI (e.g., 702, 802, 908) and receiving the PDSCH (e.g., 704, 804, 912) subsequent to the time-offset (e.g., 706, 806) for configuring one or more Rx beams based on the corresponding number of TCI states.

At 1004, the UE may receive, from the first TRP, DCI (e.g., 908) including a TCI and a time-offset. For example, 1004 may be performed by DCI component 1108 of apparatus 1102. In some aspects, the TCI may comprise at least one TCI state. In some aspects, each of the at least one TCI state may indicate a Tx beam for a TRP of a set of TRPs. In some aspects, the set of TRPs may include the first TRP.

In some aspects, for example at 1008, the UE, to determine the at least one Rx beam, may determine a number of received TCI states of the at least one TCI state received within the TCI. For example, 1008 may be performed by TCI states component 1112 of apparatus 1102.

In some aspects, for example at 1010, the UE, to determine the at least one Rx beam, may determine the threshold scheduled offset associated with the determined number of TCI states. For example, 1010 may be performed by threshold scheduled offset component 1114 of apparatus 1102.

In some aspects, for example at 1012, the UE, to determine the at least one Rx beam, may determine whether the determined threshold scheduled offset is greater than or equal to the received time-offset. For example, 1012 may be performed by determination component 1116 of apparatus 1102. In some aspects, if the determined threshold scheduled offset is not greater than or equal to the received time-offset, such as for example at 1014, the at least one Rx beam may be determined based on the received TCI if the received time-offset (e.g., 708) is greater than or equal to the determined threshold scheduled offset (e.g., 706). For example, 1014 may be performed by TCI component 1118 of apparatus 1102. In some aspects, if the determined threshold scheduled offset is greater than or equal to the received time-offset, such as for example at 1016, the at least one Rx beam may be determined based on one or more Rx beams used to monitor a PDCCH if the received time-offset (e.g., 808) is less than the determined threshold scheduled offset (e.g., 806). For example, 1016 may be performed by monitor component 1120 of apparatus 1102. In some aspects, the PDCCH may be associated with a lowest CORESET identifier.

At 1006, the UE may determine at least one Rx beam (e.g., 412, 414, 416, 612, 614, 616) based on at least one of the received TCI, the time-offset, or one or more of the plurality of threshold scheduled offsets. For example, 1006 may be performed by Rx beam component 1110 of apparatus 1102.

At 1018, the UE may receive a PDSCH from each TRP of the set of TRPs through the determined at least one Rx beam. For example, 1018 may be performed by PDSCH component 1122 of apparatus 1102. The UE may receive the PDSCH based on the received time-offset.

Figure 11:
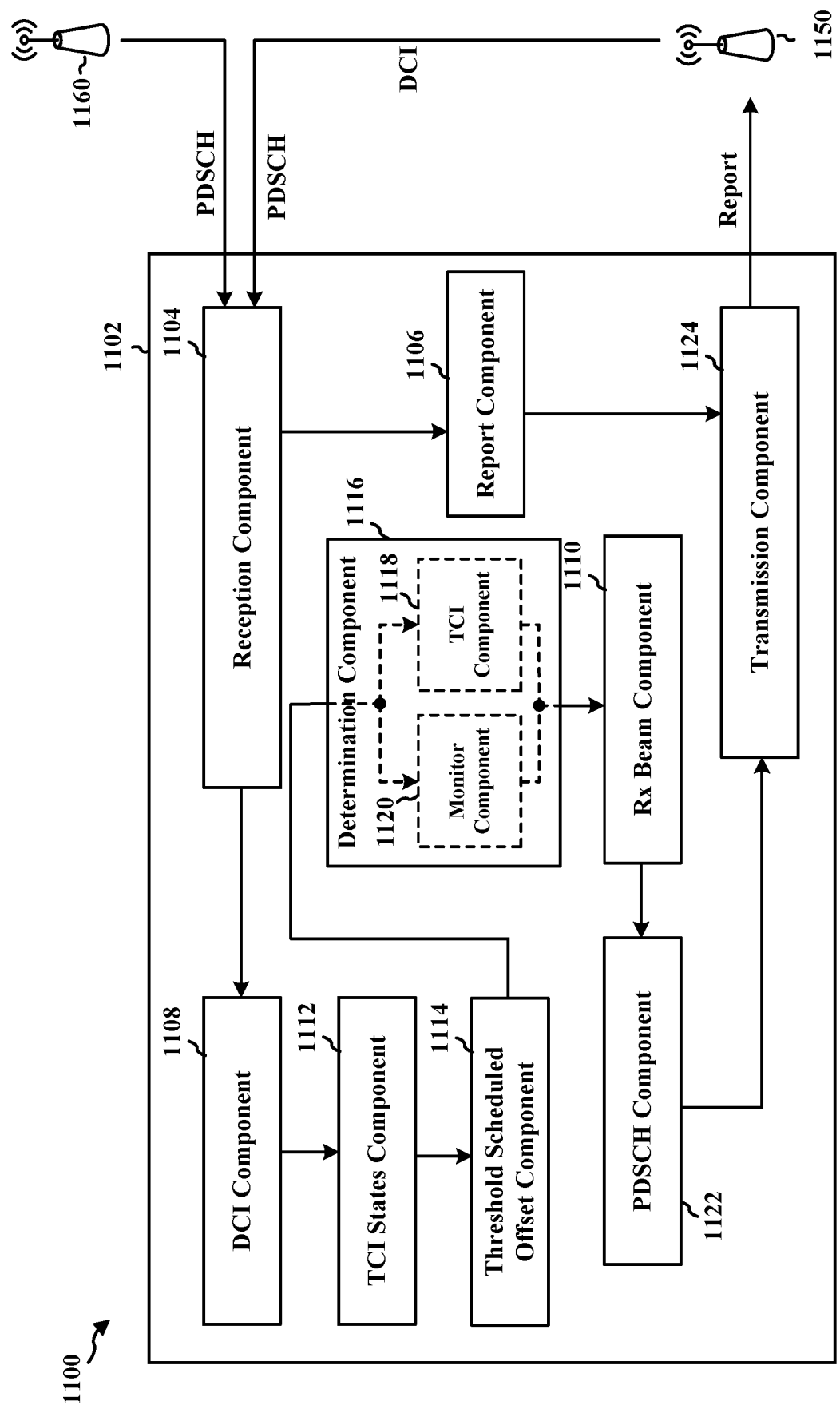
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE or a component of a UE. The apparatus includes a reception component 1104 that may receive wireless communications from one or more TRPs (e.g., 1150, 1160), e.g., as described in connection with 1004 and 1018 of FIG. 10. The apparatus includes a report component 1106 that may send a report (e.g., 906) indicating a plurality of threshold scheduled offsets, e.g., as described in connection with 1002 of FIG. 10. In some aspects, the report component 1106 may send the report (e.g., 906) to a first TRP (e.g., 902, 1150). In some aspects, each of the plurality of threshold scheduled offset (e.g., 916) may be associated with a different number of TCI states. The apparatus includes a DCI component 1108 that may receive DCI (e.g., 908) including a TCI and a time offset, e.g., as described in connection with 1004 of FIG. 10. In some aspects, the TCI may comprise at least one TCI state, where each TCI state may indicate a Tx beam for a TRP of a set of TRPs. In some aspects, the set of TRPs may include the first TRP (e.g., 902, 1150). The apparatus includes a TCI states component 1112 that may determine the number of received TCI states (e.g., 914) of the at least one TCI state received within the TCI, e.g., as described in connection with 1008 of FIG. 10. The apparatus includes a threshold scheduled offset component 1114 that may determine the threshold scheduled offset (e.g., 916) associated with the determined number of TCI states, e.g., as described in connection with 1010 of FIG. 10. The apparatus includes a determination component 1116 that may determine whether the determined threshold scheduled offset is greater than or equal to the received time-offset (e.g., 918), e.g., as described in connection with 1012 of FIG. 10. The apparatus includes a TCI component 1118 that may determine the at least one Rx beam based on the received TCI if the received time-offset (e.g., 708) is greater than or equal to the determined threshold scheduled offset (e.g., 706), e.g., as described in connection with 1014 of FIG. 10. The apparatus includes a monitor component 1120 that may determine the at least one Rx beam based on one or more Rx beams used to monitor a PDCCH if the received time-offset (e.g., 808) is less than the determined threshold scheduled offset (e.g., 806), e.g., as described in connection with 1016 of FIG. 10. In some aspects, the PDCCH may be associated with a lowest CORESET identifier. The apparatus includes a Rx beam component 1110 that may determine at least one Rx beam (e.g., 910) based on at least one of the received TCI, the time-offset, or one or more of the plurality of threshold scheduled offsets, e.g., as described in connection with 1006 of FIG. 10. The apparatus includes a PDSCH component 1122 that may receive a PDSCH from each TRP of the set of TRPs through the determined at least one Rx beam, e.g., as described in connection with 1018 of FIG. 10. In some aspects, the PDSCH may be received based on the received time-offset. The apparatus includes a transmission component 1124 that may transmit wireless communications to one or more TRPs (e.g., 1150, 1160), e.g., as described in connection with 1002 of FIG. 10.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
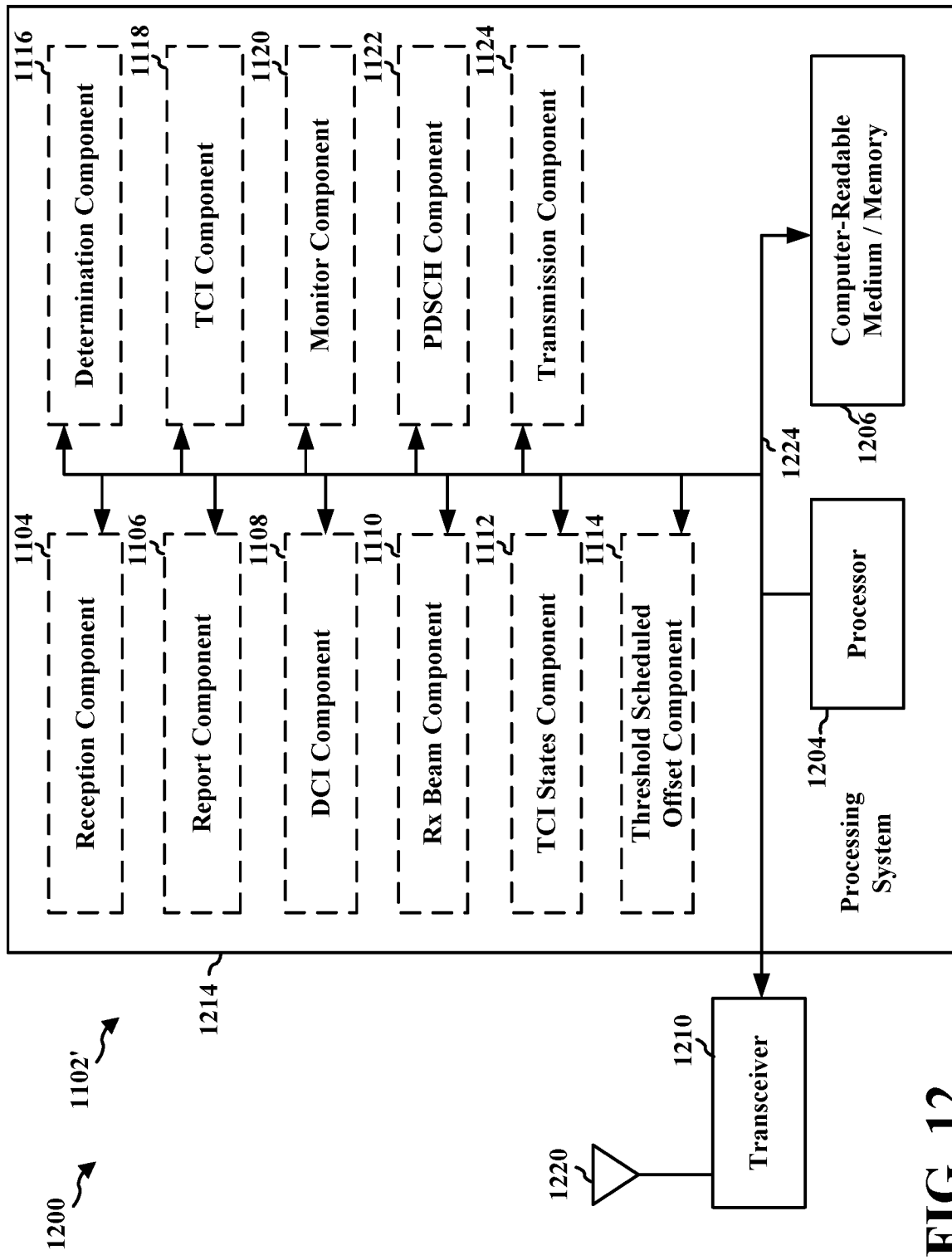
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, 1122, 1124, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1124, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120, 1122, 1124. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for sending, to a first TRP, a report indicating a plurality of threshold scheduled offsets. Each threshold scheduled offset may be associated with a different number of TCI states. The apparatus includes means for receiving, from the first TRP, DCI including a TCI and a time-offset. The TCI may comprise at least one TCI state. Each TCI state may indicate a Tx beam for a TRP of a set of TRPs. The set of TRPs may include the first TRP. The apparatus includes means for determining at least one Rx beam based on at least one of the received TCI, the time-offset, or one or more of the plurality of threshold scheduled offsets. The apparatus includes means for receiving, based on the received time-offset, a PDSCH from each TRP of the set of TRPs through the determined at least one Rx beam. The apparatus may further include means for determining a number of received TCI states of the at least one TCI state received within the TCI. The apparatus may further include means for determining the threshold scheduled offset associated with the determined number of TCI states. The apparatus may further include means for determining whether the determined threshold scheduled offset is greater than or equal to the received time-offset. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
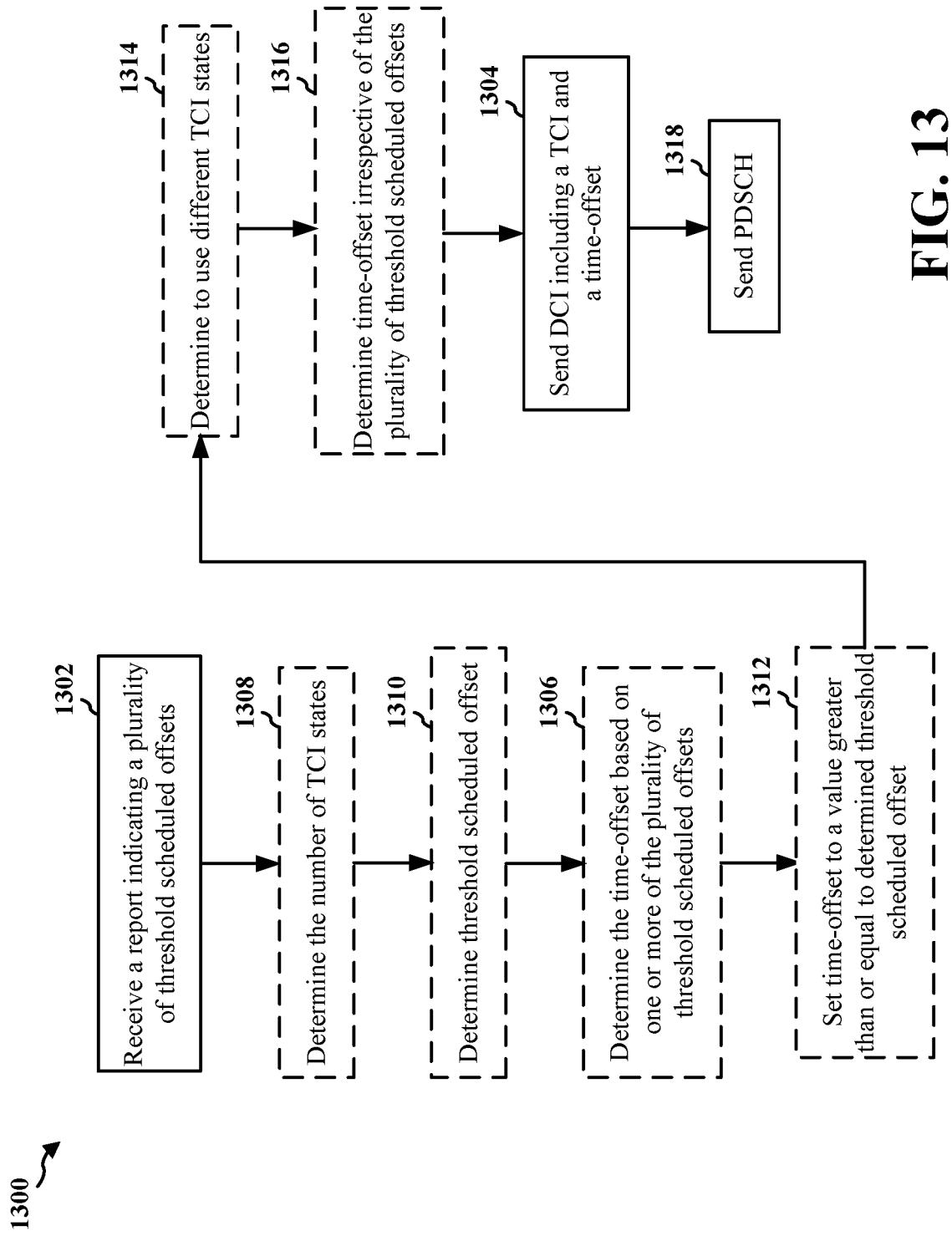
FIG. 13 is a flowchart of a method of wireless communication.

FIG. 13 is a flowchart 1300 of a method of wireless communication. The method may be performed by a base station or a component of a base station (e.g., the base station 102, 180, 310, 402, 502, 504, 602, 902, 1150, 1160; the apparatus 1402/1402'; the processing system 1514, which may include the memory 376 and which may be the entire base station 310 or a component of the base station 310, such as the TX processor 316, the RX processor 370, and/or the controller/processor 375). According to various aspects, one or more of the illustrated operations of the method 1300 may be omitted, transposed, and/or contemporaneously performed. Optional aspects are illustrated with a dashed line. The method may enable a base station to schedule Tx beams for multi-TRP operation based on a report received from a UE.

At 1302, the base station, associated with a first TRP, may receive, from a UE, a report (e.g., 906) indicating a plurality of threshold scheduled offsets. For example, 1302 may be performed by capability report component 1406 of apparatus 1402. Each threshold scheduled offset may be associated with a different number of TCI states. In some aspects, each threshold scheduled offset may be a minimum UE time offset capability between the UE receiving the DCI and the UE receiving the PDSCH subsequent to the time-offset that is needed for the UE to configure one or more Rx beams based on the corresponding number of TCI states.

In some aspects, for example at 1308, to determine the time-offset, the base station may determine a number of TCI states (e.g., 922) of the at least one TCI state sent within the TCI. For example, 1308 may be performed by TCI states component 1412 of apparatus 1402.

In some aspects, for example at 1310, to determine the time-offset, the base station may determine the threshold scheduled offset (e.g., 924) associated with the determined number of TCI states. For example, 1310 may be performed by threshold scheduled offset component 1414 of apparatus 1402.

In some aspects, for example at 1306, the base station may determine the time-offset (e.g., 920) based on one or more of the plurality of threshold scheduled offsets by setting the time-offset to be greater than or equal to the one or more the plurality of threshold scheduled offsets. For example, 1306 may be performed by time-offset component 1410 of apparatus 1402.

In some aspects, for example at 1312, to determine the time-offset, the base station may set the time-offset to a value (e.g., 926) greater than or equal to the determined threshold scheduled offset. For example, 1312 may be performed by value component 1416 of apparatus 1402.

In some aspects, for example at 1314, the base station may determine to use TCI states (e.g., 928) different from the at least one TCI state indicated in the TCI of the DCI. For example, 1314 may be performed by different TCI states component 1418 of apparatus 1402.

In some aspects, for example at 1316, the base station may determine the time-offset (e.g., 930) irrespective of the plurality of threshold scheduled offsets. For example, 1316 may be performed by determination component 1420 of apparatus 1402. The time-offset may be less than the plurality of threshold scheduled offsets.

At 1304, the base station may send, to the UE, DCI (e.g., 908) including a TCI and a time-offset. For example, 1304 may be performed by DCI component 1408 of apparatus 1402. The TCI may comprise at least one TCI state. Each TCI state may indicate a Tx beam for a TRP of a set of TRPs. The set of TRPs may include the first TRP.

At 1318, the base station may send a PDSCH (e.g., 912) through the Tx beam indicated for the first TRP. For example, 1318 may be performed by transmission component 1422 of apparatus 1402. The PDSCH may be sent based on the time-offset.

Figure 14:
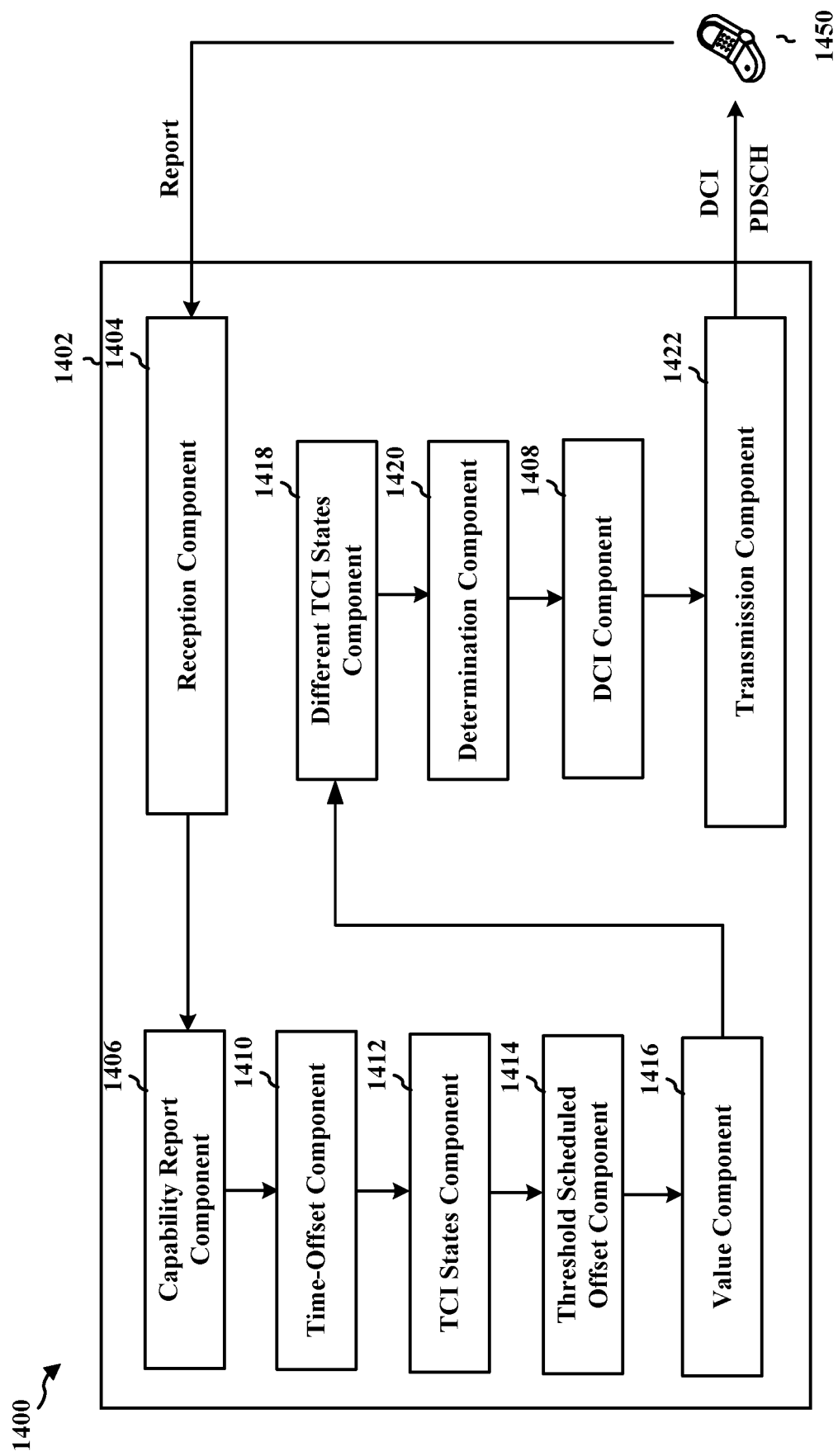
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a base station or a component of a base station. The apparatus includes a reception component 1404 that may receive uplink communications from a UE (e.g., 1450). The apparatus includes a capability report component 1406 that receives, from a UE, a report (e.g., 906) indicating a plurality of threshold scheduled offsets, e.g., as described in connection with 1302 of FIG. 13. The report (e.g., 906) may further include additional capabilities of UEs, and is not intended to be limited to indicating a plurality of threshold scheduled offsets. Each threshold scheduled offset being associated with a different number of TCI states. In some aspects, each threshold scheduled offset may be a minimum UE time offset capability between the UE receiving the DCI and the UE receiving the PDSCH subsequent to the time-offset that is needed for the UE to configure one or more Rx beams based on the corresponding number of TCI states. The apparatus includes a time-offset component 1410 that may determine the time-offset (e.g., 920) based on one or more of the plurality of threshold scheduled offsets by setting the time-offset to be greater than or equal to the one or more the plurality of threshold scheduled offsets, e.g., as described in connection with 1306 of FIG. 13. The apparatus includes a TCI States component 1412 that may determine a number of TCI states (e.g., 922) of the at least one TCI state sent within the TCI, e.g., as described in connection with 1308 of FIG. 13. The apparatus includes a threshold scheduled offset component 1414 that may determine the threshold scheduled offset (e.g., 924) associated with the determined number of TCI states, e.g., as described in connection with 1310 of FIG. 13. The apparatus includes a value component 1416 that may set the time-offset to a value (e.g., 926) greater than or equal to the determined threshold scheduled offset, e.g., as described in connection with 1312 of FIG. 13. The apparatus includes a different TCI states component 1418 that may determine to use TCI states (e.g., 928) different from the at least one TCI state indicated in the TCI of the DCI, e.g., as described in connection with 1314 of FIG. 13. The apparatus includes a determination component 1420 that may determine the time-offset (e.g., 930) irrespective of the plurality of threshold scheduled offsets, e.g., as described in connection with 1316 of FIG. 13. The time-offset may be less than the plurality of threshold scheduled offsets. The apparatus includes a DCI component 1408 that sends, to the UE, DCI (e.g., 908) including a TCI and a time-offset (e.g., 708, 808), e.g., as described in connection with 1304 of FIG. 13. The TCI may comprise at least one TCI state. Each TCI state may indicate a Tx beam for a TRP (e.g., 902) of a set of TRPs. The set of TRPs may include the first TRP (e.g., 902). The apparatus includes a transmission component 1422 that sends a PDSCH through the Tx beam indicated for the first TRP, e.g., as described in connection with 1318 of FIG. 13. The PDSCH may be sent based on the time-offset.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
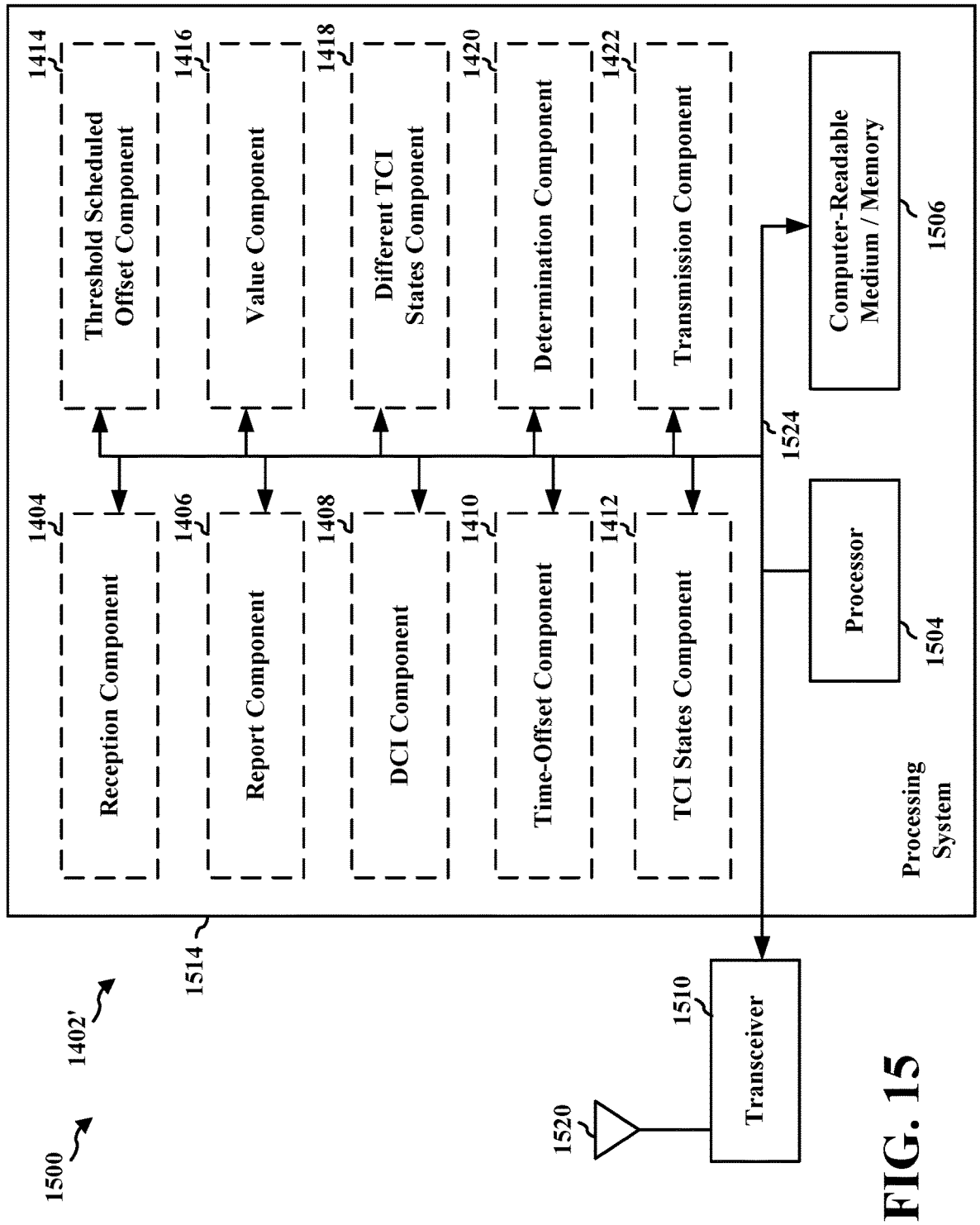
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1418, 1420, 1422, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1422, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1418, 1420, 1422. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3).

In one configuration, the apparatus 1402/1402' for wireless communication includes means for receiving, from a UE, a report indicating a plurality of threshold scheduled offsets. Each threshold scheduled offset being associated with a different number of TCI states. The apparatus includes means for sending, to the UE, DCI including a TCI and a time-offset. The TCI may comprise at least one TCI state. Each TCI state may indicate a Tx beam for a TRP of a set of TRPs. The set of TRPs may include the first TRP. The apparatus includes means for sending, based on the time-offset, a PDSCH through the Tx beam indicated for the first TRP. The apparatus may further include means for determining the time-offset based on one or more of the plurality of threshold scheduled offsets by setting the time-offset to be greater than or equal to the one or more the plurality of threshold scheduled offsets. The apparatus may further include means for determining a number of TCI states of the at least one TCI state sent within the TCI. The apparatus may further include means for determining the threshold scheduled offset associated with the determined number of TCI states. The apparatus may further include means for setting the time-offset to a value greater than or equal to the determined threshold scheduled offset. The apparatus may further include means for determining to use TCI states different from the at least one TCI state indicated in the TCI of the DCI. The apparatus may further include means for determining the time-offset irrespective of the plurality of threshold scheduled offsets, the time-offset being less than the plurality of threshold scheduled offsets. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The present disclosure allows a UE to provide a report to at least one TRP indicating a plurality of threshold scheduled offsets, where each threshold scheduled offset is associated with a different number of TCI states. The report sent by the UE 104 may have a threshold scheduled offset for any number and/or configuration of TRPs transmitting to the UE. The present disclosure also allows a base station to process the report from the UE to assist in scheduling Tx beams for multi-TRP operations. At least one advantage of the invention is that the base station takes into consideration the plurality of threshold scheduled offsets from the UE for scheduling Tx beams for multi-TRP operation. Yet another advantage of the invention is that by utilizing the report to generate the schedule, the base station may ensure that UEs have sufficient time to determine and prepare one or more Rx beams based on the schedule sent by the base station to the UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   sending, to a first transmit (Tx)/receive (Rx) point (TRP), a report indicating a plurality of threshold scheduled offsets, each threshold scheduled offset being associated with a different number of transmission configuration indication (TCI) states;
   receiving, from the first TRP, downlink control information (DCI) including a TCI and a time-offset, the TCI comprising at least one TCI state, each TCI state indicating a Tx beam for a TRP of a set of TRPs, the set of TRPs including the first TRP;
   determining at least one Rx beam based on at least one of the received TCI, the time-offset, or one or more of the plurality of threshold scheduled offsets; and
   receiving, based on the received time-offset, a physical downlink shared channel (PDSCH) from each TRP of the set of TRPs through the determined at least one Rx beam.

2. The method of claim 1, wherein each threshold scheduled offset is a minimum UE time offset capability between receiving the DCI and receiving the PDSCH subsequent to the time-offset that is needed for configuring one or more Rx beams based on the corresponding number of TCI states.

3. The method of claim 1, wherein the determining the at least one Rx beam comprises:
   determining a number of received TCI states of the at least one TCI state received within the TCI;
   determining the threshold scheduled offset associated with the determined number of TCI states; and
   determining whether the determined threshold scheduled offset is greater than or equal to the received time-offset.

4. The method of claim 3, wherein the at least one Rx beam is determined based on the received TCI if the received time-offset is greater than or equal to the determined threshold scheduled offset.

5. The method of claim 3, wherein the at least one Rx beam is determined based on one or more Rx beams used to monitor a physical downlink control channel (PDCCH) if the received time-offset is less than the determined threshold scheduled offset.

6. The method of claim 5, wherein the PDCCH is associated with a lowest common resource set (CORESET) identifier.

7. An apparatus for wireless communication, comprising:
a memory; and
at least one processor coupled to the memory and configured to:
send, to a first transmit (Tx)/receive (Rx) point (TRP), a report indicating a plurality of threshold scheduled offsets, each threshold scheduled offset being associated with a different number of transmission configuration indication (TCI) states;
receive, from the first TRP, downlink control information (DCI) including a TCI and a time-offset, the TCI comprising at least one TCI state, each TCI state indicating a Tx beam for a TRP of a set of TRPs, the set of TRPs including the first TRP;
determine at least one Rx beam based on at least one of the received TCI, the time-offset, or one or more of the plurality of threshold scheduled offsets; and
receive, based on the received time-offset, a physical downlink shared channel (PDSCH) from each TRP of the set of TRPs through the determined at least one Rx beam.

8. The apparatus of claim 7, wherein each threshold scheduled offset is a minimum UE time offset capability between receiving the DCI and receiving the PDSCH subsequent to the time-offset that is needed for configuring one or more Rx beams based on the corresponding number of TCI states.

9. The apparatus of claim 7, wherein to determine the at least one Rx beam the at least one processor is configured to:
determine a number of received TCI states of the at least one TCI state received within the TCI;
determine the threshold scheduled offset associated with the determined number of TCI states; and
determine whether the determined threshold scheduled offset is greater than or equal to the received time-offset.

10. The apparatus of claim 9, wherein the at least one Rx beam is determined based on the received TCI if the received time-offset is greater than or equal to the determined threshold scheduled offset.

11. The apparatus of claim 9, wherein the at least one Rx beam is determined based on one or more Rx beams used to monitor a physical downlink control channel (PDCCH) if the received time-offset is less than the determined threshold scheduled offset.

12. The apparatus of claim 11, wherein the PDCCH is associated with a lowest common resource set (CORESET) identifier.

13. A method of wireless communication of a base station (BS), the BS being associated with a first transmit (Tx)/receive (Rx) point (TRP), comprising:
receiving, from a user equipment (UE), a report indicating a plurality of threshold scheduled offsets, each threshold scheduled offset being associated with a different number of transmission configuration indication (TCI) states;
sending, to the UE, downlink control information (DCI) including a TCI and a time-offset, the TCI comprising at least one TCI state, each TCI state indicating a Tx beam for a TRP of a set of TRPs, the set of TRPs including the first TRP; and
sending, based on the time-offset, a physical downlink shared channel (PDSCH) through the Tx beam indicated for the first TRP.

14. The method of claim 13, wherein each threshold scheduled offset is a minimum UE time offset capability between the UE receiving the DCI and the UE receiving the PDSCH subsequent to the time-offset that is needed for the UE to configure one or more Rx beams based on the corresponding number of TCI states.

15. The method of claim 13, further comprising determining the time-offset based on one or more of the plurality of threshold scheduled offsets by setting the time-offset to be greater than or equal to the one or more the plurality of threshold scheduled offsets.

16. The method of claim 15, wherein the determining the time-offset comprises:
determining a number of TCI states of the at least one TCI state sent within the TCI;
determining the threshold scheduled offset associated with the determined number of TCI states; and
setting the time-offset to a value greater than or equal to the determined threshold scheduled offset.

17. The method of claim 13, further comprising:
determining to use TCI states different from the at least one TCI state indicated in the TCI of the DCI; and
determining the time-offset irrespective of the plurality of threshold scheduled offsets, the time-offset being less than the plurality of threshold scheduled offsets.

18. An apparatus for wireless communication, comprising:
a memory; and
at least one processor coupled to the memory and configured to:
receive, from a user equipment (UE), a report indicating a plurality of threshold scheduled offsets, each threshold scheduled offset being associated with a different number of transmission configuration indication (TCI) states;
send, to the UE, downlink control information (DCI) including a TCI and a time-offset, the TCI comprising at least one TCI state, each TCI state indicating a Tx beam for a TRP of a set of TRPs, the set of TRPs including a first TRP; and
send, based on the time-offset, a physical downlink shared channel (PDSCH) through the Tx beam indicated for the first TRP.

19. The apparatus of claim 18, wherein each threshold scheduled offset is a minimum UE time offset capability between the UE receiving the DCI and the UE receiving the PDSCH subsequent to the time-offset that is needed for the UE to configure one or more Rx beams based on the corresponding number of TCI states.

20. The apparatus of claim 18, wherein the at least one processor is configured to:
determine the time-offset based on one or more of the plurality of threshold scheduled offsets by setting the time-offset to be greater than or equal to the one or more the plurality of threshold scheduled offsets.

21. The apparatus of claim 20, wherein to determine the time-offset the at least one processor is configured to:
determine a number of TCI states of the at least one TCI state sent within the TCI;
determine the threshold scheduled offset associated with the determined number of TCI states; and
set the time-offset to a value greater than or equal to the determined threshold scheduled offset.

22. The apparatus of claim 18, wherein the at least one processor is configured to:
determine to use TCI states different from the at least one TCI state indicated in the TCI of the DCI; and determine the time-offset irrespective of the plurality of threshold scheduled offsets, the time-offset being less than the plurality of threshold scheduled offsets.

\* \* \* \* \*